(12) United States Patent
Bellandi et al.

(10) Patent No.: US 6,199,848 B1
(45) Date of Patent: Mar. 13, 2001

(54) FLUID POWER GRIPPER

(75) Inventors: Giuseppe Bellandi; Giuseppe Maffeis, both of Roncadelle (IT)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/417,570

(22) Filed: Oct. 14, 1999

(30) Foreign Application Priority Data

Oct. 22, 1998 (EP) .................................................. 98119983

(51) Int. Cl.⁷ .................................................. B23Q 3/08
(52) U.S. Cl. ............................................. 269/34; 269/227
(58) Field of Search .............................. 269/32, 34, 227

(56) References Cited

U.S. PATENT DOCUMENTS 5,657,973   8/1997   Zajac, Jr. et al. .

FOREIGN PATENT DOCUMENTS

| 38 06 148 A1 | 9/1988 | (DE) . |
|---|---|---|
| 92 14 477 | 12/1992 | (DE) . |
| 0 344 953 A1 | 12/1989 | (EP) . |
| 1257813 * | 2/1961 | (FR) .................................. 269/34 |

* cited by examiner

Primary Examiner—Robert C. Watson
(74) Attorney, Agent, or Firm—Hoffman & Baron, LLP

(57) ABSTRACT

A fluid power gripper which contains a receiving space, in which two pistons are located able to be moved axially by fluid power in opposite drive directions, such pistons being kinematically coupled by a synchronization means. The synchronization means comprises first mesh means, which are provided on opposite mutually facing side surfaces of two mutually overlapping axial tails of the pistons. Furthermore the synchronization means comprises second mesh means provided on a body of revolution arranged between the two axial tails and having an axis of rotation extending athwart the longitudinal axis of the receiving space.

19 Claims, 4 Drawing Sheets

FLUID POWER GRIPPER

BACKGROUND OF THE INVENTION

The invention relates to a fluid power gripper comprising a housing having a receiving space in which two pistons are located able to be moved by fluid power to perform oppositely directed axial drive movements, which pistons are connected or adapted to be respectively connected with a gripper element, a synchronization means, including a body of revolution, for synchronization of the drive movements of the two pistons, such synchronization means having first mesh means, provided on the two pistons, and second mesh means simultaneously in engagement with the first mesh means, such second mesh means being provided on the body of revolution, and axial tails provided on the two adjacent end regions of the two pistons, such axial tails overlapping one another axially and being opposite to each other with a clearance athwart the longitudinal axis of the receiving space, such tails furthermore bearing, on facing lateral surface thereof, the first mesh means, the body of revolution bearing the second mesh means being arranged in an intermediate space present between the two axial tails and being mounted for rotation about an axis of rotation extending athwart the longitudinal axis of the receiving space in relation to the housing

THE PRIOR ART

A fluid power gripper of this type, which is also termed a parallel gripper, is disclosed in the German patent publication (utility model) U 9,214,477. This gripper possesses a housing with an elongated receiving space, in which two pistons are arranged, which are respectively connected with the aid of a guide pin, which extends through the end wall of the housing, with a gripper element. When the inner section of the receiving space between the two pistons is put under pressure, the two pistons are moved away from one another and if the two outer receiving space sections are put under pressure simultaneously the pistons are moved toward each other. It is in this manner that an opening or closing movement of the gripper elements may be produced, the synchronization means ensuring ganged motion of the two pistons and consequently of the gripper elements.

In the case of a known gripper as disclosed in the U.S. Pat. No. 5,657,973 the synchronization means comprises a threaded rod, which extends through the two pistons and makes threaded engagement with them. Since a left hand screw thread is provided in the engagement zone with the one piston and in the engagement zone with the other piston a right hand screw thread is provided, there is a synchronized coupling of the movements of the two pistons via the threaded rod. A disadvantage of this arrangement is however the high friction at the screw threaded engagement zones making it necessary for the piston to provide large setting forces, and this is an obstacle to designing on a small and miniature scale. Furthermore elaborate sealing means are required in the zones where the screw threaded rod extends through the piston in order to provide a fluid-tight seal between the inner receiving space and the outer receiving spaces.

SHORT SUMMARY OF THE INVENTION

One object of the invention is to provide a gripper of the type initially mentioned which while having a simple structure is characterized ba low friction operation and which simplifies the design of small overall sizes of grippers.

In order to achieve these and/or other objects appearing from the present specification, claims and drawings, in the present invention in the peripheral part of the two pistons the housing is respectively provided with an axially extending longitudinal slot which is open on the one hand radially inward into the receiving space and on the other hand radially outward to an outer face of the housing and each of such longitudinal slots has an entraining means extending through it, such entraining means producing an entraining connection between the respectively associated piston and one of two gripper carriers, arranged to slide on the outer region of the housing, or gripper elements, the entraining means running at a right angle to the axis of rotation of the body of revolution.

This means that the mesh engagement between the mesh means provided on the pistons and on the body of revolution extends along only an extremely small axial length of the receiving space, this leading to low friction losses. Owing to the mutual arrangement at a right angle to one another of the entraining means and the axis of rotation of the body of revolution it is furthermore possible for the tendency to run skew in the mesh engagement to be reduced. Even relatively small drive forces are sufficient to move the piston with the associated gripper elements, something which favors design on a small scale. The assembly of the components in meshing engagement with one another of the gripper is relatively simple and furthermore the constructional complexity is reduced, because a sealed arrangement of the body of revolution where it extends through the pistons is unnecessary. This is something which increases functional reliability because the number of seals is diminished.

Further advantageous developments of the invention are defined in the claims.

A design which is more particularly suitable for products with large dimensions is such that the axial tails are designed like racks, their mutually facing teeth constituting the first mesh means. The body of revolution is in this case best designed in the form of a gear wheel such as a pinion.

More particularly in the case of minimum overall sizes a design is to be recommended in the case of which the first mesh means have respectively only one single recess, the second mesh means arranged on the body of revolution being constituted by only two mutually diametrally opposite projections, which fit respectively into one of the recesses of the first mesh means. It would be feasible as well to have a reversed arrangement having projections arranged on the piston and recesses provided in the body of revolution.

In order to ensure simple assembly an arrangement is to be recommended in which the body of revolution is rotatably mounted on a bearing journal or pin, which extends through the receiving space and has its two axial end region locked in the housing to prevent mutual rotation. In this respect it is possible for the body of revolution to be mounted on the bearing journal so that axial sliding motion is possible.

The attachment of the bearing journal is best such that it is swaged into a transverse hole extending through the housing athwart and through the receiving space. In addition or alternatively there may also be a provision such that the bearing journal ends in the transverse hole at a distance within the housing, closure elements being provided in the outer terminal sections of the transverse hole, such closure elements being more particularly constituted by screw elements and being anchored to the housing.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
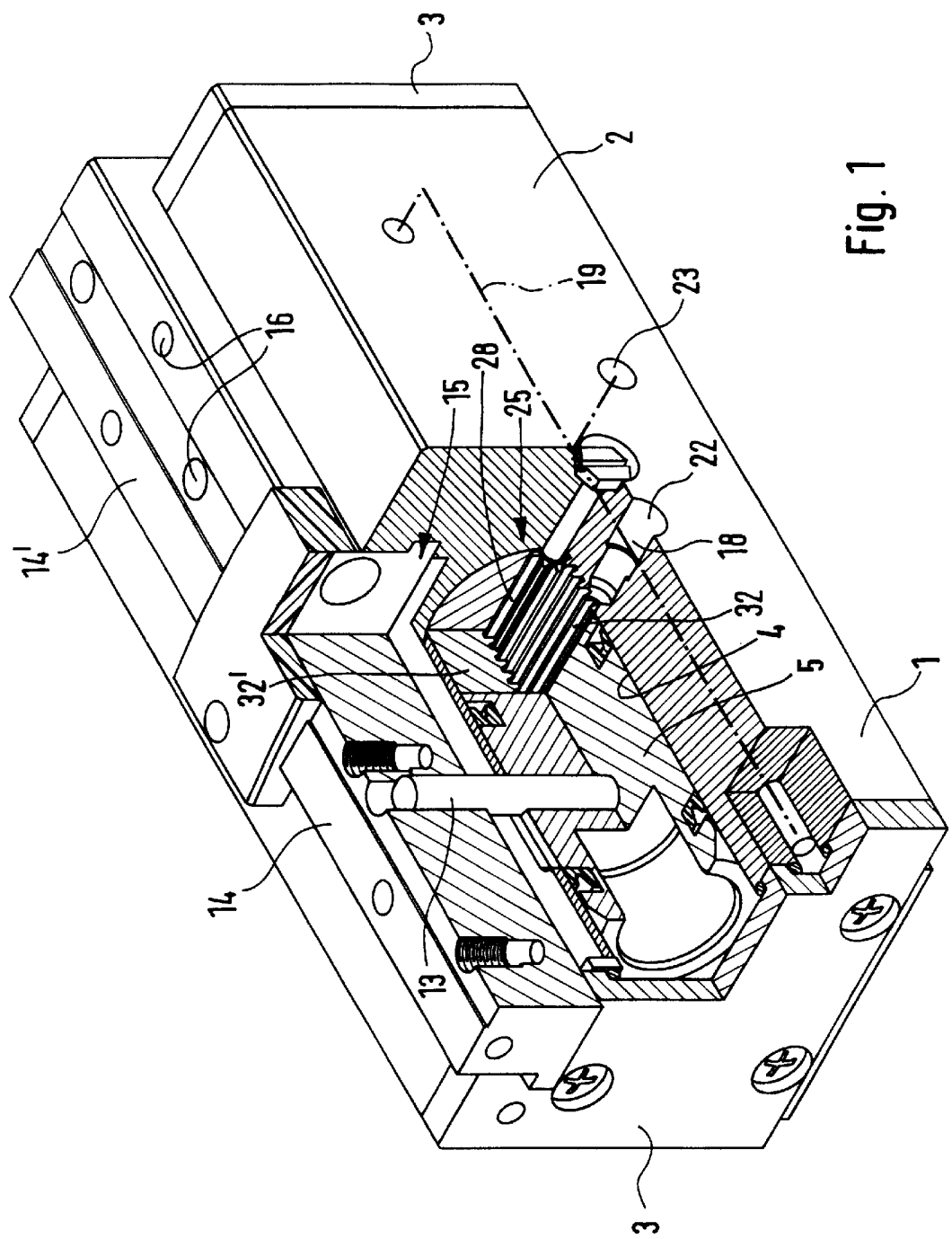
FIG. 1 shows a preferred design of the gripper in accordance with the invention in a perspective representation, some of it being illustrated partly broken away.

The fluid power gripper depicted in the drawings comprises a housing 1, which is for example in the form of a parallelopiped having a tubular center section 2, which at its ends is sealed in a fluid-tight fashion by end plates 3. In the housing a more particularly cylindrical longitudinal receiving space 4 is provided, wherein two pistons 5 and 5' are arranged in sequence for axial motion.

There is no separating wall between the two pistons 5 and 5'. Consequently the two pistons 5 and 5' jointly delimit an inner receiving space section 6 arranged between them. At the sides or end of a each piston 5 and 5' opposite to the inner space section there is a an outer receiving space section 7 and 7' which is on the one hand delimited by the associated piston 5 and 5' and on the other hand by the adjacent end plate 3.

Annular seals 8 and 9 on the outer periphery of each piston 5 and 5' are in sealing and sliding engagement with the inner face of the receiving space 4 and thus produce a fluid-tight separation between the inner receiving space section 6 and the two outer receiving space sections 7 and 7' respectively.

In the peripheral region of the two pistons 5 and 5' the housing 1 is provided with an axially extending longitudinal slot 12 and 12', which is open on the one hand radially inward into the receiving space 4 and on the other hand radially outward at an outer face of the housing 1.

Each of the two axially spaced apart longitudinal slots 12 and 12' has an entraining means 13 and 13' extending therethrough, which produces an entraining connection between the respectively associated piston 5 and 5' and one of two gripper element carriers 14 and 14' arranged in a sliding manner.

In the illustrated working embodiment the entraining means 13 and 13' are designed in the form of pins, their inner end regions being permanently anchored in the recesses in the pistons 5 and 5' and their outer end regions being in recesses in the gripper element carriers 14 and 14', such anchoring being for example by swaging and pressing.

Each gripper element carrier 14 and 14' is provided with attachment means 16, for example in the form of threaded holes, which permit a detachable or, respectively, replacement-permitting attachment of gripper elements 17, which are only indicated in chained lines. These gripper elements 17 can also be termed gripping jaws. It would be feasible as well for the gripper elements 17 to be set on the pistons 5 and 5' without the provision of intermediate, separate gripper element carriers 14 and 14'.

Each piston 5 and 5' bears two coaxially aligned and axially spaced annular seals 8 and 9. Same are so arranged that the longitudinal slot 12 and 12' associated with the respective piston when located in either of the possible axial positions of the respective piston 5 and 5' is still between the two seals 8 and 9. This ensures that no pressure medium can escape from the receiving space 4 through the longitudinal slots 12 and 12'.

A first fluid duct arrangement 18 extending in the housing 1 opens at one end in the inner receiving space section 6 and at the other end via a first connection port 22 at a suitable position on the outer face of the housing 1. A second fluid duct arrangement 19 also extending in the wall of the housing 1 opens on the one hand simultaneously into the two outer receiving space sections 7 and 7' and on the other hand via a second connection port at a suitable position on the outer face of the housing 1, more particularly in the vicinity of the first connection port 22.

Figure 2:
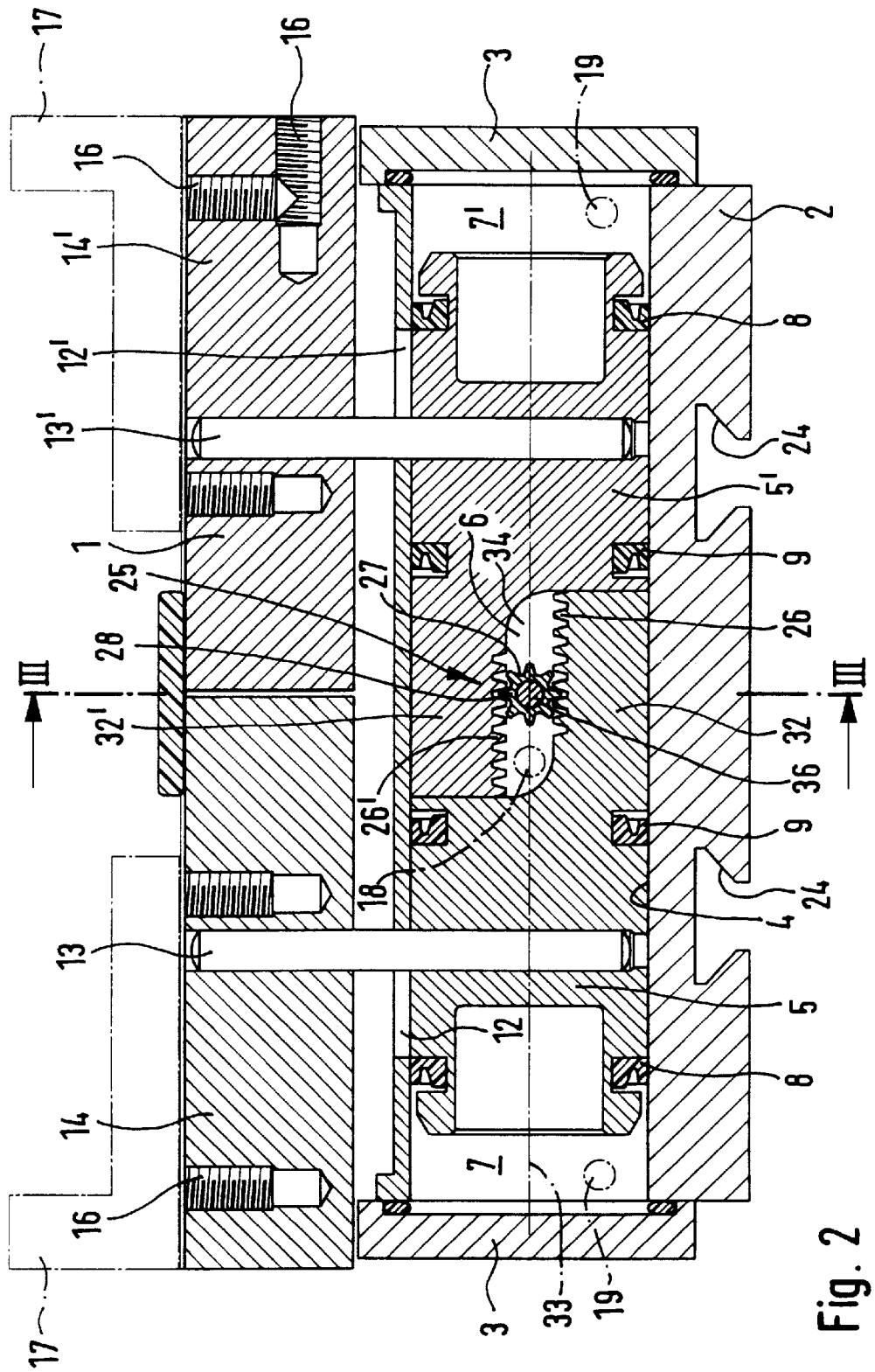
FIG. 2 shows the gripper in accordance with FIG. 1 in a longitudinal section taken on the section line II—II of FIG. 3.
Figure 4:
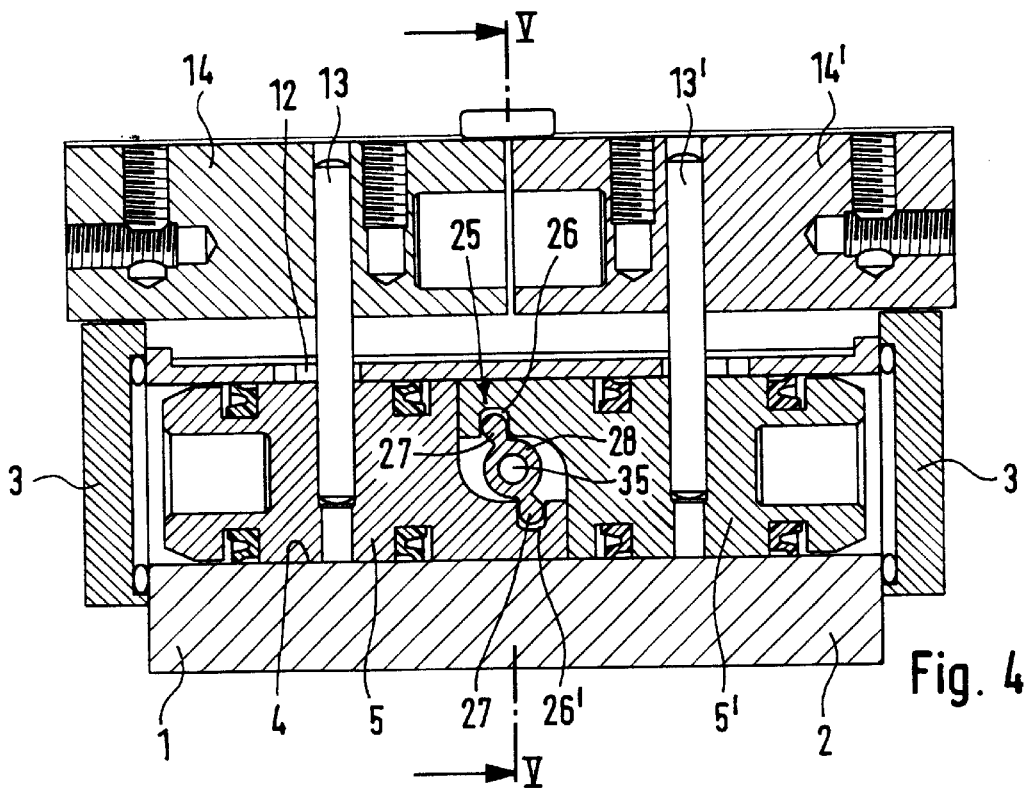
FIG. 4 shows a further embodiment of the gripper only essentially differing from that of FIGS. 1 through 3 as regards the different form of the synchronization means, in a longitudinal section taken on the section line IV—IV of FIG. 5.

During operation of the gripper controlled fluid actuation of the receiving space sections 6, 7 and 7' via the fluid duct arrangements 18 and 19 is possible in order to produce a sliding movement of the pistons 5 and 5'. The pressure medium is preferably compressed air, whose supply and discharge is controlled by an intermediately placed valve arrangement (not illustrated in detail). When the inner receiving space section 6 is put under pressure and there is simultaneous venting of the two outer receiving space sections 7 and 7' the two pistons 5 and 5' will move apart until they arrive at the end plates 3 or some other abutment means stops them. In the case of simultaneous pressurization of the outer receiving space sections 7 and 7' in connection with venting of the inner receiving space section 6 the pistons 5 and 5' move toward one another until, as shown in FIGS. 2 and 4, they run up against each other or hit some other abutment. The motion of the pistons is transmitted via the entraining means 13 and 13' to the gripper element carriers 14 and 14' and, respectively, the gripper elements 17, which may consequently perform a gripping function in relation to an object to be grasped. The gripper is more especially employed for handling purposes, more particularly in manufacturing and assembly technology, it being positioned as required using handling equipment, which is not specially illustrated, to which it is attached using suitable attachment means 24. The latter are best located on the longitudinal side of the housing 1 opposite to the gripper elements 17.

In order to ensure a ganged, regular movement of the pistons 5 and 5' and consequently of the gripper elements 17 kinematically coupled therewith a synchronization means 25 is provided. Same is located in the inner receiving space section 6 and is responsible for a kinematic coupling of the two pistons 5 and 5' in such a manner that the two pistons 5 and 5' may only be moved simultaneously at the same speed and the same displacement in opposite directions. Owing to this positive coupling it would in principle be possible to have operation of the gripper, if only one of the outer receiving space sections 7 and 7' is connected with the second fluid duct arrangement 19. The displacement of one piston in one direction automatically causes an opposite, that is to say axially oppositely directed movement of the other piston. The synchronization means 25 possesses first mesh means 26 and 26' provided on the two pistons 5 and 5' and furthermore second mesh means 27, which are in meshing simultaneous engagement with such two first mesh means, such second mesh means 27 being provided on a body 28 of revolution.

At its axial end region facing the other piston each piston 5 and 5' possesses an axial tail 32 and 32' extending toward the other piston. The axial tails 32 and 32' are arranged eccentrically with respect to the center of the receiving space 4, the tails overlapping each other axially and being opposite to one another athwart the longitudinal axis 33, and more especially at a right angle to it, of the receiving space 4 with a clearance. The first mesh means 26 and 26' are provided on mutually opposite side faces of the axial tails 32 and 32' and preferably machined integrally in same.

In the illustrated working embodiment each axial tail 32 and 32' has a cross sectional form like that of a circular segment. Its face section with the shape of a circular segment preferably constitutes a direct axial extension of the peripheral face of the associated piston 5 and 5' and touches the outer face of the receiving space 4. On the outer side, which is radially opposite to the first mesh means 26 and 26', preferably therefore each axial tail 32 and 32' bears against the inner face of the receiving space 4 athwart its longitudinal axis 33.

The body 28 of revolution is located in the intermediate space 34 between the first mesh means 26 and 26' of the axial tails 32 and 32', the body 28 being so aligned that its axis 35 of rotation extends athwart the longitudinal axis 33 of the receiving space 4 and more particularly at a right angle thereto. The arrangement is more particularly such that the axis 35 of rotation intersects the longitudinal axis 33 of the receiving space 4 at a right angle.

When an axial movement of the pistons 5 and 5' takes place the body 28 of revolution performs a rotary movement about its axis 35 of rotation, its second mesh means 27 always remaining in engagement at diametrally opposite regions with the two first mesh means 26 and 26' of the pistons 5 and 5'.

The mounting of the body 28 of revolution so that same can rotate is preferably by means of a bearing journal 36 fixed to the housing so that it cannot rotate. For this purpose it is possible to provide a transverse hole 37, which extends through the housing 1 and extends transversely in the receiving space 34. This means that there are two coaxially aligned hole sections 38 arranged on diametrally opposite sides of the receiving space 4, such hole sections 38 respectively receiving an end section of the bearing journal 36 which for instance is in the form of a pin, such journal having a section 42 thereof extending diametrally through the receiving space 4. In the illustrated working embodiment the bearing journal 36 has its end sections lightly thrust or force fitted into the hole sections 38 so that it is thus fixed axially. As an additional locking means there is however also the provision the bearing journal 36 ends at a distance from the outer face of the housing 1 within the same, the outer end sections of the transverse hole 37 having closure elements 43 or plugs inserted in them which are anchored to the housing. The anchoring effect is most simply ensured by designing the closure element as screw elements, which are permanently screwed into end sections, provided with a female thread, of the transverse hole 37.

The closure elements 43 are preferably inserted in a sealing manner in the housing 1 in order to prevent escape of fluid through the transverse hole 37.

The body 28 of revolution is mounted in a freely rotatable fashion on the section 42 of the bearing journal 33. In the illustrated working embodiment furthermore axial displacement of the body 28 of revolution in relation to the bearing journal 36 is possible, the latter accordingly not requiring an abutment means and therefore being able to be produced more simply.

Figure 3:
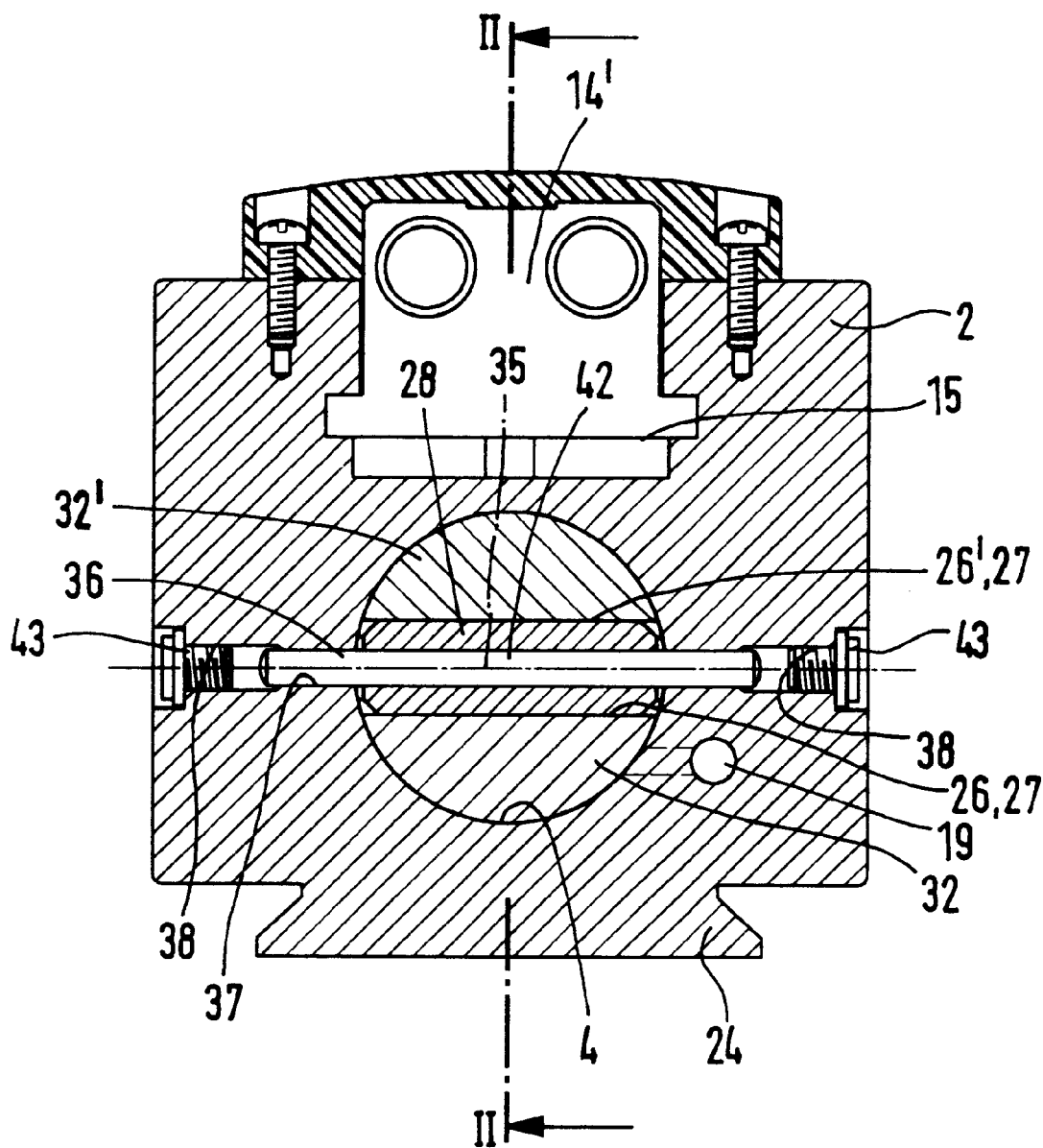
FIG. 3 shows the gripper in accordance with FIGS. 1 and 2 in a cross section taken on the section line III—III of FIG. 2.

In the illustrated working embodiment of FIGS. 1 and 3 the axial length of the body 28 of revolution is essentially the same as the size of the diameter of the receiving space 4 with the result that the body 28 of revolution is fixed in the receiving space 4 with a small amount of axial play. Using suitable greasing or lubricating measures it is possible to reduce wear. In the illustrated working embodiment of FIGS. 4 such 5 a body 28 of revolution is employed, whose axis length is distinctly less than the size of the diameter of the receiving space 4.

In any case it is possible to use bodies 28 of revolution manufactured of synthetic resin to reduce wear.

The gripper design in accordance with FIG. 1 through 3 is more particularly designed for large overall sizes, in the case of which a comparatively long stroke of the gripper elements and accordingly of the pistons 5 and 5' as well is required. The axial tails 32 and 32' are here designed like racks, their facing mesh means, extending in one plane, constituting the first mesh means 26 and 26'. In the illustrated working embodiment the first mesh means 26 and 26' are located on a section, which is linear as considered in cross section, of the axial tails 32 and 32' which in cross section are like circular segments. The individual teeth and recesses of the first mesh means 26 and 26' extend athwart the longitudinal axis 33 of the receiving space 4, same being arranged in sequence along the longitudinal axis 33.

The body 28 of revolution is in this case preferably designed in the form of a gear wheel, whose outwardly facing outer periphery bears the second mesh means 27, preferably in the form of spur wheel whose tooth are parallel to its axis. During the reciprocating motion of the pistons 5 and 5' the gear wheel-like body 28 of revolution runs on the first mesh means 26 and 26', it being able to perform any desired number of revolutions. Grippers with different strokes may therefore be provided simply by the use of different lengths of axial tails 32 and 32' or, respectively, first mesh means 26 and 26'.

Figure 5:
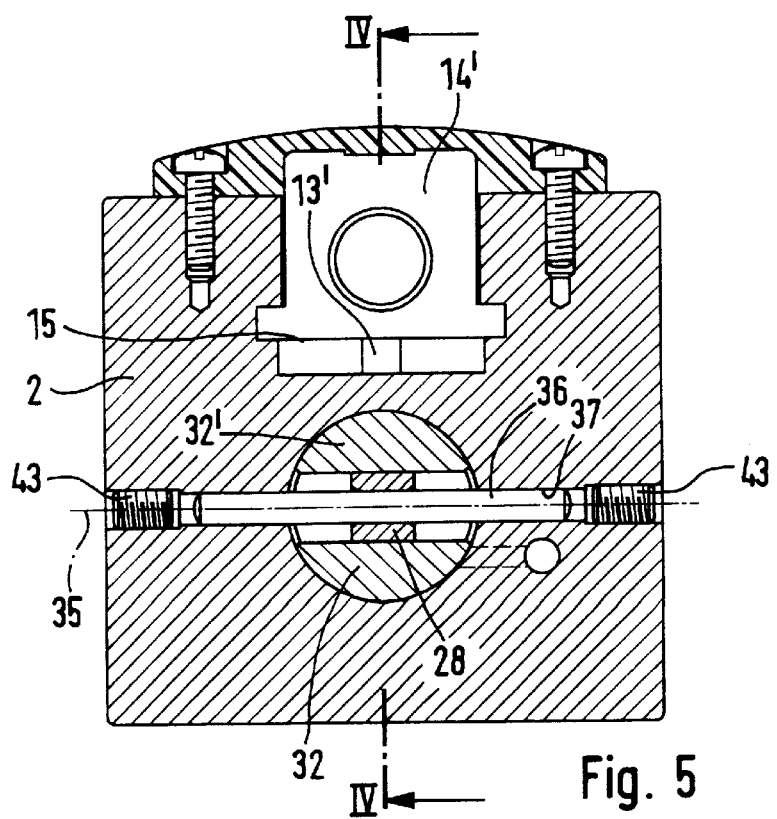
FIG. 5 shows the gripper of FIG. 4 in a cross section taken on the section line V—V.

If only small strokes of the gripper elements 17 are required so that the body 28 of revolution does not have to perform a complete rotation, recourse may be had to the design of FIGS. 4 and 5. Here the first mesh means 26 and 26' are respectively constituted by only one single recess, the second mesh means 27 provided on the body 28 of revolution comprising two diametrally opposite projections, which respectively fit into one of the recesses. In order to render possible jerk-free motion the projections are preferably radiused at edges thereof.

Alternatively it would also be possible to provide a mechanical reversal of parts so that the first mesh means 26 and 26' would be respectively constituted by one projection, whereas the second mesh means 27 would be in the form of diametrally oppositely arranged recesses, into which one of the projections would fit.

What is claimed is:

1. In a fluid power gripper comprising a housing having a receiving space having a longitudinal axis in which two pistons are located and able to be moved by fluid power to perform oppositely directed axial drive movements, each of the two pistons being connectable with a gripper element and a synchronization means, the synchronization means including a body of revolution, for synchronization of the drive movements of the two pistons, and having first mesh means, provided on the two pistons, and second mesh means simultaneously in engagement with the first mesh means, the second mesh means being provided on the body of revolution, and axial tails provided on the two adjacent end regions of the two pistons, the axial tails overlapping one another axially and being opposite to each other with an intermediate space defined therebetween, the tails furthermore including, on facing lateral surfaces thereof, the first mesh means, the body of revolution including the second mesh means being arranged in the intermediate space present between the two axial tails and being mounted for rotation about an axis of rotation extending perpendicular to the longitudinal axis of the receiving space in relation to the housing, the improvement comprising the housing being provided with at least one axially extending longitudinal slot open both radially inward into the receiving space and radially outward to an outer face of the housing, the at least one longitudinal slot including an entraining means extending therethrough, the entraining means producing an entraining connection between a respectively associated piston and a respectively associated gripper element arranged to slide on an outer region of the housing, the entraining means extending outwardly from the housing at a right angle to the axis of rotation of the body of revolution and crosswise to the longitudinal axis of the receiving space.

2. The improvement as set forth in claim 1, wherein the axial tails include mutually facing rack teeth constituting the first mesh means.

3. The improvement as set forth in claim 1, wherein the body of revolution is designed in the form of a gear wheel.

4. The improvement as set forth in claim 1, wherein the first mesh means respectively only comprise a single recess, the second mesh means provided on the body of revolution being constituted by only two projections which are diametrally opposite in relation to the axis of rotation, such projections being in engagement respectively with one of the recesses.

5. The improvement as set forth in claim 1, wherein the first mesh means respectively only comprise a single projection, the second mesh means provided on the body of revolution being constituted by only two recesses which are diametrically opposite in relation to the axis of rotation, such recesses being in engagement respectively with one of the projections.

6. The improvement as set forth in claim 1, wherein the body of revolution is mounted in a rotatable manner on a bearing journal secured at two end regions thereof in the housing and extending through the receiving space.

7. The improvement as set forth in claim 6, wherein the body of revolution is mounted in an axially sliding manner on the bearing journal.

8. The improvement as set forth in claim 6, wherein the bearing journal is inserted in a transverse hole extending through the housing and is more particularly swaged in position here.

9. The improvement as set forth in claim 6, wherein the bearing journal is inserted in a transverse hole extending through the housing and ends at a distance from the outer face within the housing, closure elements being inserted in the outer end sections of the transverse hole, such closure elements being more particularly constituted by screw elements.

10. A fluid power gripper comprising:

a housing having a longitudinal receiving space formed therein and at least one longitudinal slot extending axially from said receiving space to an outer surface of said housing;

at least two pistons movable within said receiving space along a longitudinal axis thereof to perform oppositely directed axial drive movements;

a gear wheel fixed within said receiving space, said gear wheel simultaneously engaging said pistons for synchronizing movement thereof and having an axis of rotation perpendicular to said longitudinal axis;

a pin fixed to each of said pistons, said pins extending through said at least one longitudinal slot of said housing in a direction perpendicular to said axis of rotation of said gear wheel and perpendicular to said longitudinal axis; and a gripper element connected to each of said pins, said gripper elements arranged to slide on said outer surface of said housing.

11. The fluid power gripper as set forth in claim 10, wherein the pistons include mutually facing rack teeth for engaging the gear wheel.

12. The fluid power gripper as set forth in claim 10, wherein each of the pistons includes a single recess and the gear wheel includes two diametrically opposite projections, the projections being in respective engagement with the recesses of the pistons.

13. The fluid power gripper as set forth in claim 10, wherein each of the pistons includes a single projection and the gear wheel includes two diametrically opposite recesses, the recesses being in respective engagement with the projections of the pistons.

14. The fluid power gripper as set forth in claim 10, wherein the gear wheel is rotatably mounted on a bearing journal secured at two end regions thereof in the housing and extending through the receiving space.

15. The fluid power gripper as set forth in claim 14, wherein the gear wheel is axially slidable within the bearing journal.

16. The fluid power gripper as set forth in claim 14, wherein the bearing journal is fixed in a transverse hole extending through the housing.

17. The fluid power gripper as set forth in claim 16, wherein the bearing journal is swaged in the transverse hole of the housing.

18. The fluid power gripper as set forth in claim 16, wherein the transverse hole includes closure elements at opposite ends thereof.

19. The fluid power gripper as set forth in claim 18, wherein the closure elements comprise screws threaded into opposite ends of the transverse hole.

* * * * *